March 19, 1957 P. ROBINSON 2,786,088
ELECTROCHEMICAL SYSTEMS
Filed Sept. 9, 1952

INVENTOR.
PRESTON ROBINSON
BY
Connolly and Hutz
HIS ATTORNEYS

United States Patent Office 2,786,088
Patented Mar. 19, 1957

2,786,088

ELECTROCHEMICAL SYSTEMS

Preston Robinson, Williamstown, Mass., assignor to Sprague Electric Company, North Adams, Mass., a corporation of Massachusetts Application September 9, 1952, Serial No. 308,620

6 Claims. (Cl. 136—83)

This invention relates to improved electrochemical systems and more particularly refers to novel primary and secondary cells containing ion-active masses.

There are a number of electrochemical systems which have been more or less successful on a commercial basis. There are many more systems, however, which have attractive features, but which have not been commercially employed. With many of these latter systems, one serious disadvantage lies in the accumulation of undesirable by-products during discharge or use of the cell. These by-products may, for example, increase the internal resistance of the cell, remove water from the electrolyte or may inhibit the primary electrochemical reaction by shifting the equilibrium thereof. Another disadvantage, found in many of the unsuccessful systems, is the solubility of the oxidizing or depolarizing agent in the electrolyte, resulting in poor shelf life for the system. A further disadvantage in dry cells is the necessity of providing an electrolyte carrier and a barrier. Each of these increases the internal resistance of the dry cell, and the use of both results in a substantial internal resistance.

It is an object of the present invention to overcome the foregoing and related disadvantages. A further object is to produce new and improved primary and secondary cells. Additional objects will become apparent from the following description and claims.

The invention is broadly concerned with electro-chemical systems, particularly voltaic cells, containing at least one metal electrode and at least one insoluble ion-exchange material. By "ion-exchange material," is meant a solid, organic or inorganic material which is relatively insoluble in the other components of the system, but which will exchange anions and/or cations in the system. For the sake of clarity, various embodiments of the invention will be individually described in the following paragraphs.

According to one embodiment of the invention, there is produced an electro-chemical system containing as a major component a cation-active mass, conforming to the general description given above. This cation-active mass may be present in the anode compartment, the electrolyte compartment and/or the cathode compartment of the cell. A number of functions can be accomplished through the use of the cation-active mass, as follows:

a. Removal of cations from the system,
b. Release of hydrogen ions to the system,
c. Barrier to prevent migration of solid particles,
d. Exchange of cations, i. e. release of cations higher in the electromotive series for those lower in the series,
e. Chemical and physical bonding of other active materials, and
f. As electrolytes.

According to another embodiment of the invention, there is produced an electrochemical system containing as a major component an anion-active mass, conforming to the general description given previously. This anion-active mass may be present in the anode compartment, in the electrolyte compartment and/or in the cathode compartment of the cell. The anion-active mass can be employed for a number of functions, as follows:

a. Insolubilization of oxidizing anions,
b. Removal of metalate ions from the electrolyte,
c. Release of $OH^-$ ions to the system,
d. As electrolytes,
e. Barrier to prevent migration of solid particles, and
f. Chemical and physical bonding of other active materials.

It is to be understood that each type of mass may be employed for more than one function in any given system, and that unitary or individual anion-active and cation-active masses may be used in the same system.

According to other embodiments of the invention, secondary cells containing the cation-active and anion-active masses referred to above are produced. Such cells can be charged for reuse, after the normal discharge cycle, by electrolytic regeneration of the ion-active masses and other system components.

According to yet another embodiment of the invention, novel physical cell structures are produced with the organic, resinous ion-active masses of the invention.

The nature of the ion-active mass must be such that it conforms to the general description earlier presented. It must be relatively insoluble in the electrochemical system and must be capable of exchanging cations and/or anions in the system. Among the inorganic materials which meet these requirements are phosphorus oxychloride resins, certain dolomites, certain heavy-metal silicates, certain greensands, etc. Very desirable results can be obtained by the use of such inorganic materials, particularly with many active electrolytes. The use of organic ion-active masses, however, is generally preferred since unusual physical structures can be more readily produced therefrom, and since the masses themselves can be prepared under close control to meet any special characteristic desired for special electrochemical systems.

A number of general types of organic materials are suitable for use as ion-active masses according to the invention. Most of these materials have a relatively high molecular weight, since their solubility is generally reduced as the size of the molecule is increased. The particular classes of organic ion-active masses which are preferred in accordance with the present invention include ion-active polymerization resins, condensation resins, esterfication resins and natural resins and rosins. These will be discussed by class in the succeeding paragraphs.

Suitable polymerization resins include those derived from monomers having one or more ethylenic linkages. The ion activity of these resins can be produced by incorporating ion-active groups in the monomer before polymerization, or by treating a normal polymer to introduce the appropriate group or radical in a plurality of positions on each of the large molecules. Representative polymerization, ion-active masses include polyvinyl aniline (anion-active), sulfonated styrene-divinyl benzene copolymers (cation-active), sulfonated coumarone-indene resins (cation-active), polyvinyl thiazole (anion-active), polyvinyl pyridine (anion-active), polyacrylic acids (cation-active), etc.

Suitable condensation resins include a large number of ion-active masses produced by the condensation of what may be termed complementary molecules, such as, for example, of phenol and formaldehyde. As in the case of polymerization resins, the ion-active groups may be present in one or more of the reactant molecules or may be incorporated in the final condensation product by suitable chemical treatment. The preferred resins of this class are formed by condensation of various molecules with aldehyde molecules, such as formaldehyde. Among the former there may be mentioned phenol, aniline, melamine, tannin, casein, urea, diphenyl amine, phenylenediamine, cyanamide, dicyandiamide, etc. In most instances, the ion-active groups are introduced as a part of one or more of the reacting molecules. The ion-active groups that are advisably present are discussed in a later section.

A number of esterification resins are likewise applicable in accordance with the invention. One particularly useful category is the esterification product of a dibasic acid with a diamine. These resins can be produced with an excess of diamine or an excess of dibasic acid, with resulting anion or cation-activity, respectively. Polyhydric alcohols, diisocyanates, diacid chlorides and acid anhydrides are also useful in the preparation of such ion-active masses.

Natural resins are useful, particularly when modified to maximum ion-activity states, such as by sulfonation, amination, condensation with aldehyde sulfonic acids, oxidation, etc. Pine rosins, cashew nut oils, etc. may also be thus modified.

As previously indicated, there are a number of ion-active radicals or groups which find particular utility in the practice of the invention. For cation activity, the following groups are desirable:

—SO₃H    —CH₂SO₃H    —COOH
—CH₂OH   —CH₂SH      —OH (aromatic)

Radicals particularly adapted to impart anion activity include:

—NH₂ (aromatic and aliphatic)
=NH
≡N

The preparation of the ion-active masses may be an integral part of the preparation of the cell, or it may, of course, be carried out independently.

Reference is now made to various representative electrochemical systems wherein the invention may be practiced.

The use of cation-active masses to remove cations from an operating system is particularly advantageous. The cation-active mass may be employed in the free acid form, represented by RH, or in the salt form, as represented by RNa, RK etc. Since the alkali metals appear at the top of the electromotive series, their use does not generally interfere with the reactions in the system. Suitable systems wherein cations are removed include the system, Zn, Hg, RK/K₂O, H₂O/HgO, C wherein the net reaction is Zn+2RK→2K+R₂Zn The cation-active mass may also be employed as an electrolyte in electrochemical systems, such as Zn, Hg/RNa, H₂O/Fe(NO₃)₃, C Also in the system, Zn, Hg/RNa/R₃Fe wherein the net reaction is Zn+2R₃Fe→R₂Zn+2R₂Fe the iron going to a lower valency state. Furthermore, in the system, Al/RH/R₄Mn whose net reaction is 2Al+3R₄Mn→3R₂Mn+2R₃Al The cation-active masses can be used for the above purposes and have additional advantages for physical reasons, as will later be described with reference to the appended drawing.

The use of the anion-active masses parallels the use of the cation-active masses in some respects, but differs widely in others. Representative applications of these masses in electrochemical systems are shown in the following examples. One useful application is in the insolubilization of oxidizing groups for numerous systems. The insolubilization is actually an arbitrary definition for a state in which the activity of the oxidizing group is limited to the discharge period, rather than continuously without the flow of current. The following are examples of such systems:

Fe/H₂SO₄/XCr₂O₇
Zn/NH₄Cl, H₂O/XMnO₄
Ni/KOH/XMnO₄ in which X represents the anion-active mass, normally substituted or associated with OH⁻ ions. The oxidizing group is introduced into the anion-active mass prior to incorporation within the electrochemical system, usually by treatment of the mass with the corresponding acid.

As with the cation-active masses, the anion-active mass can be used per se as an electrolyte, wherein OH⁻ ions are provided, and coincidentally, metalate ions are removed from the system, thus preventing conductivity decrease and effectively regenerating the electrolyte, for example, in the system, Zn, Hg, XOH/K₂O, H₂O/CuO, Cu in which system the net reaction is K₂ZnO₂+2XOH→X₂ZnO₂+2KOH and in the system, Pb/X₂SO₄, H₂O/PbO₂

Combined use of anion-active and cation-active masses is also a desirable procedure. One of many systems to which this is applicable is Fe, XOH/RK, H₂O/Ni₂O₃, Ni Since it is not necessary for water to be present in many of the electrochemical systems herein contemplated, unusual, low temperature and high temperature and other special cells can be produced without the limitations conventionally inherent with aqueous electrolytes.

For a more ready understanding of the invention reference is made to the appended drawings illustrating several practical embodiments thereof. In these drawings:

Figures 4a, 4b, 4c and 4d show a composite, roll-type cell of the invention and its cooperating elements.

Figure 1:
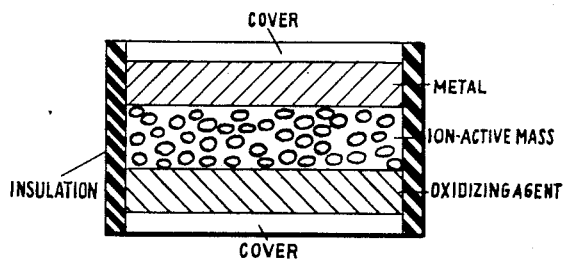
Figure 1 is a cross-section of a primary cell of the invention.

Referring particularly to Figure 1, a simple cell is shown. In this cell a metal anode is separated from an oxidizing agent by an electrolyte consisting of one of the ion-active masses of the invention. The latter may be used in the "dry" state or saturated with water or other liquid medium. The sides of the cell are insulated as indicated, and the top and bottom are provided with covers which also serve as terminal means. It is not essential that such cells be sealed.

Figure 2:
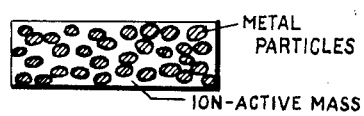
Figure 2 is a cross-section of an anode of the invention.

Figure 2 represents a cross section of a porous metal anode in which particles of metal are bonded together, usually by the amalgamation process, but by other means, if so desired. In the pores of the anode is an ion-active mass, which in turn may be saturated with a liquid medium, such as water. The ion-active mass is generally employed as shown in Figure 2, in order to remove metalate ions, metal ions and/or to regenerate the electrolyte.

Figure 3:
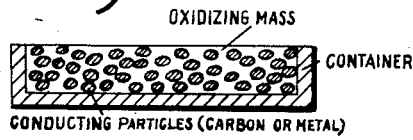
Figure 3 is a cross-section of a cathode of the invention.
Figure 3:
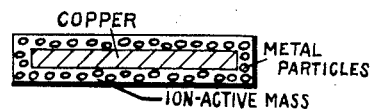
Figure 3:
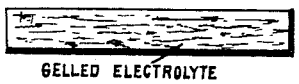
Figure 3:
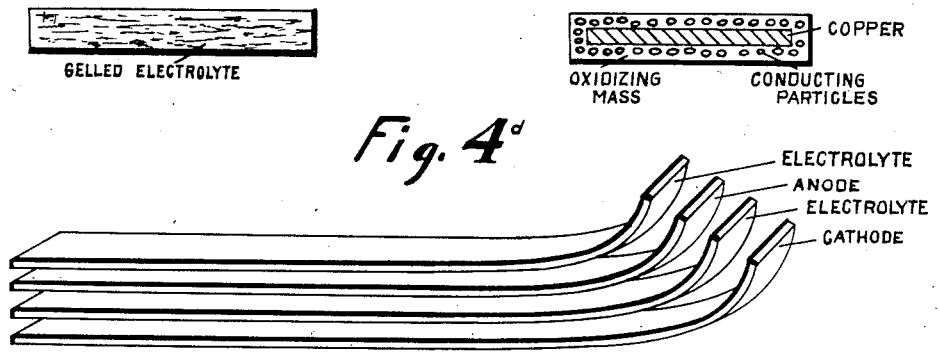

Figure 3 illustrates a special cathode compartment wherein the oxidizing agent consists of an ion-active mass formulated to incorporate the oxidizing group, such as chromate, nitrate, permanganate, persulfate, etc. Since the ion-active mass is preferably more or less insoluble in the electrolyte, it is usually a poor conductor, and it is, therefore, advisable to incorporate conducting particles in the mass, in order to reduce the resistivity thereof to a practical value. For this purpose, metals, such as copper, silver and colloidal mercury, or nonmetallic conductors, such as graphite, may be incorporated within the mass. The mass may be consolidated into a container such as shown, although this is not an essential feature of the invention.

Figures 4a, 4b, 4c and 4d show a rolled cell, although pictorially illustrated for the sake of clarity in its unrolled condition. This cell consists of two electrolyte strips, one anode strip and one cathode strip, convolutely wound in a manner such that the electrolyte separates the cathode and anode throughout the winding. Figure 4a shows a cross-section of the anode strip. A flexible, base conductor, such as copper, is provided with an adherent coating of particles of the metal to be reduced and particles of the ion-active mass. Figure 4b shows a cross-section of the physically immobilized electrolyte, generally a gelled electrolyte solution. The gellant may be an ion-active mass or a substance that is inert in the particular system. Figure 4c shows a cross-section of the cathode element. This consists of a conducting, flexible, metal base strip which is coated with an adherent layer of an oxidizing, ion-active mass and an inert conductor, such as copper or graphite (compare Figure 3).

A multitude of physical structures are made possible by the present invention. Particularly novel structures result from the ability to use the ion-active masses simultaneously as barrier materials, binder materials, and active materials.

In accordance with one of the preferred embodiments of the invention, conducting particles and/or metals are incorporated into ion-active masses of the organic type prior to polymerization, condensation or esterification thereof. In this manner it is possible to incorporate large amounts of graphite, copper, zinc or other conducting and/or anode materials without necessitating milling or other complicated and perhaps degrading physical processes. This procedure is applicable to the oxidizing, ion-active masses and to the modification of anode structures with anion-active or cation-active masses.

In accordance with a further embodiment of the invention, the organic ion-active masses can be molded into unusual and complicated shapes by heat-pressure molding operations. In such instances, the mass is usually prepared in a partially polymerized, condensed or esterified state, in order that it will exhibit thixotropic properties during the molding process, thus flowing into narrow recesses, etc.

Further, it is possible to produce oxidizing, ion-active masses, after forming the original anion-active mass into a special shape, such as a thin film. The preparation of thin films from solutions of the original resin can then be followed by treatment with the appropriate acid, resulting in an exchange of ions to incorporate the oxidizing anion in the resin mass, and in insolubilization of the film.

As many apparently widely different embodiments of this invention may be made without departing from the spirit and scope hereof, it is to be understood that this invention is not limited to the specific embodiments hereof except as defined in the appended claims.

I claim:
1. An electrochemical system comprising an anode, an electrolyte and a cathode, said cathode being in contact with an oxidizing agent having an oxidizing ion in oxidation-reduction equilibrium within the system and said anode being in electronic contact with a substantially insoluble anion-exchange material for said ion.

2. An electrochemical system comprising an anode metal, an electrolyte and a cathode, said cathode comprising a substantially insoluble synthetic anion-exchange resin holding an oxidizing ion in oxidation-reduction equilibrium with the system.

3. A primary cell comprising the system $Zn/NH_4Cl$, $H_2O/XMnO_4$, wherein X represents a substantailly insoluble anion-exchange material, to which is attached the $MnO_4$ ion.

4. A primary cell comprising the system Zn, Hg, $XOH/K_2O$, $H_2O/CuO$, Cu wherein X represents a substantially insoluble cation-exchange material with which the $OH^-$ ion is associated.

5. The combination of claim 6 in which the ion-exchange material is intimately mixed with finely divided electronically conductive particles that are electronically connected to the electrode with which it is in oxidation-reduction equilibrium.

6. A battery having a cathode, an anode, an electrolyte connecting these electrodes, and a substantially insoluble ion-exchange material in ion-exchange equilibrium with an oxidizing ion and in galvanic oxidation-reduction equilibrium with one of the electrodes.

References Cited in the file of this patent
UNITED STATES PATENTS

| Re. 22,065 | Young | Apr. 7, 1942 |
| 1,835,867 | Heise | Dec. 8, 1931 |
| 1,835,868 | Heise | Dec. 8, 1931 |
| 2,057,232 | Endell | Oct. 13, 1936 |
| 2,233,281 | Brown | Feb. 25, 1941 |
| 2,251,399 | Cole | Aug. 5, 1941 |
| 2,306,927 | Arsem | Dec. 29, 1942 |
| 2,463,565 | Ruben | Mar. 8, 1949 |
| 2,514,415 | Rasch | July 11, 1950 |
| 2,526,640 | Daniel | Oct. 24, 1950 |
| 2,582,973 | Ellis | Jan. 22, 1952 |
| 2,607,809 | Pitzer | Aug. 19, 1952 |
| 2,619,437 | Glasstone | Nov. 25, 1952 |
| 2,636,851 | Juda et al. | Apr. 28, 1953 |

FOREIGN PATENTS

| 491,073 | Belgium | Sept. 12, 1949 |

OTHER REFERENCES

Technical Reviews, pages 139C–151C, July 1950, vol. 97, No. 7.

Inorganic Reactions, by Gilman, pp. 64, 86, 92, 94 and 114.